(12) United States Patent
Kim et al.

(10) Patent No.: US 7,551,937 B2
(45) Date of Patent: Jun. 23, 2009

(54) METHOD AND DEVICE FOR ALLOCATING RADIO RESOURCES IN WIRELESS PORTABLE NETWORK SYSTEM

(75) Inventors: Jae-Heung Kim, Daejeon (KR); Soon-Yong Lim, Daejeon (KR); Chul-Sik Yoon, Daejeon (KR); Kun-Min Yeo, Daejeon (KR); Seok-Joo Shin, Gwangju (KR); Boong-Gee Song, Seongnam (KR); Kwang-Seop Eom, Seongnam (KR); Min-Hee Cho, Anyang (KR); Jae-Hee Cho, Seongnam (KR); Byung-Han Ryu, Daejeon (KR); Seung-Ku Hwang, Seoul (KR)

(73) Assignees: Electronics and Telecommunications Research Institute, Daejeon (KR); Samsung Electronics Co., Ltd., Suwon-si, Gyeonggi-do (KR); SK Telecom Co., Ltd., Seoul (KR); KT Corporation, Seongnam, Kyungki-do (KR); Ktfreetel Co., Ltd., Seoul (KR); Hanaro Telecom., Inc., Seoul (KR)

( * ) Notice: Subject to any disclaimer, the term of this patent is extended or adjusted under 35 U.S.C. 154(b) by 163 days.

(21) Appl. No.: 10/565,010

(22) PCT Filed: Jul. 16, 2004

(86) PCT No.: PCT/KR2004/001781

§ 371 (c)(1),
(2), (4) Date: Aug. 1, 2006

(87) PCT Pub. No.: WO2005/008360

PCT Pub. Date: Jan. 27, 2005

(65) Prior Publication Data

US 2007/0010268 A1   Jan. 11, 2007

(30) Foreign Application Priority Data

Jul. 18, 2003  (KR) ...................... 10-2003-0049117
Apr. 21, 2004  (KR) ...................... 10-2004-0027469

(51) Int. Cl.
*H04Q 7/20* (2006.01)
(52) U.S. Cl. ........................... 455/509; 455/450
(58) Field of Classification Search .................. None
See application file for complete search history.

(56) References Cited

U.S. PATENT DOCUMENTS

2002/0168944 A1 * 11/2002 Terry et al. ................. 455/67.1
2004/0116126 A1 *  6/2004 Cave et al. .................. 455/450

FOREIGN PATENT DOCUMENTS

JP    08-033008    2/1996
JP    2002-204204  7/2002

OTHER PUBLICATIONS

Sarikaya B.; "Packet Mode in Wireless Networks: Overview of Transition to Third Generation"; Communications Magaine, IEEE, vol. 38; Issue 9; Sep. 2000; pp. 164-172.

(Continued)

*Primary Examiner*—Lester Kincaid
*Assistant Examiner*—Phuoc Doan
(74) *Attorney, Agent, or Firm*—Lowe Hauptman Ham & Berner, LLP

(57) ABSTRACT

Information for different subscribers of a service with the same modulation and channel encoding method is transmitted by allocating radio resources in a wireless portable Internet system. Also, identifier information on the subscriber of a concurrently allocated radio resource is transmitted through common control information. Therefore, information for a plurality of subscribers coexists in a single radio resource block, and it can be easily transmitted. Since a subscriber station which has received downlink information can know to which radio resource block the information for the corresponding station is allocated through the subscriber identifier information transmitted as common control information, the subscriber station can access desired information by accessing a specific radio resource block to which information for the subscriber is allocated in the received frame.

19 Claims, 14 Drawing Sheets

OTHER PUBLICATIONS

International Search Report dated Oct. 3, 2005 for PCT/KR2004/001781.

Japanese Office Action for Japanese application No. 2006-520994.

IEEE std. 802.16-2001 IEEE Standard for Local and Metropolitan area networks Part 16, Air Interface for Fixed Broadband Wireless Access Systems, 2002 p. 219-225.

IEEE 802. 16e-03/07r2 Part 16, Air Interface for BroadbandWireless Access Systems—Amendment 4, Mobility Enhancements, 2003 p. 32.

* cited by examiner

METHOD AND DEVICE FOR ALLOCATING RADIO RESOURCES IN WIRELESS PORTABLE NETWORK SYSTEM

CROSS REFERENCE TO RELATED APPLICATION

This application is the National Phase application of International Application No. PCT/KR2004/001781, filed Jul. 16, 2004, which designates the United States and was published in English. This application, in its entirety, is incorporated herein by reference.

TECHNICAL FIELD

The present invention relates to a method and device for allocating radio resources in a wireless portable network system. More specifically, the present invention relates to a radio resource allocating method and device for accessing a radio resource to which packet data for a corresponding subscriber station are allocated, and retrieving information by allocating a radio resource and transmitting subscriber information when allocating the resource of a downlink in a wireless portable network system.

BACKGROUND ART

A wireless portable Internet is a next generation communication method for further supporting nobility for short range data communication methods which use fixed access points, such as the conventional wireless LAN.

Various standards for the wireless portable Internet have been proposed, and the international standard of the portable Internet has progressed by focusing on the IEEE 802.16e.

FIG. 1 shows a brief diagram of the wireless portable Internet.

A wireless portable Internet system comprises an SS (subscriber terminal) 10, base stations 20 and 21 for performing wireless communication with the SS 10, routers 30 and 31 connected to the base stations through a gateway, and the Internet.

The wireless LAN method such as the conventional IEEE 802.11 provides a data communication method for allowing short-range wireless communication with reference to a fixed access point, and it does not provide nobility of the SS but rather it supports the short-range data communication in a wireless manner instead of on the cable basis.

The wireless portable Internet system driven by the IEEE 802.16 group guarantees mobility and provides a seamless data communication service when the SS 10 shown in FIG. 1 is moved to a cell managed by the base station 21 from another cell managed by the base station 20.

The IEEE 802.16 basically supports the MAN (metropolitan area network), and represents an information communication network covering an intermediate area of between the LAN and the WAN.

Therefore, the wireless portable Internet system supports a handover of the SS 10 in a like manner of the mobile communication service, and assigns dynamic 1P addresses according to movement of the SS.

In this instance, the SS communicates with the base stations 20 and 21 through the OFDMA (orthogonal frequency division multiple access) method, which is a multiplexing method having combined the FDM (frequency division multiplexing) method which uses a plurality of subcarriers of orthogonal frequencies as a plurality of subchannels, and the TDM (time division multiplex) method. The OFDMA method is essentially resistant to the fading phenomenon generated on the multi-paths, and has high data rates.

Also, the IEEE 802.16 has adopted the AMC (adaptive modulation and coding) method for adaptively selecting a modulation and coding method according to a request and an acceptance between the SS 10 and the base stations 20 and 21.

FIG. 2 shows a hierarchical structure of the wireless portable Internet system.

The hierarchical structure of the wireless portable Internet system of the IEEE 802.16e is generally classified as a physical layer L10, and an MAC (media access control) layer L21, L22, and L23.

The physical layer L10 performs wireless communication functions executed on the conventional physical layers, such as modulation, demodulation, and encoding.

The wireless portable Internet system does not have layers classified according to their functions, but allows a single MAC layer to perform various functions, differing from the wired Internet system.

Regarding sublayers according to the functions, the MAC layer comprises a privacy sublayer L21, an MAC common part sublayer L22, and a service specific convergence sublayer L23.

The service specific convergence sublayer L23 performs a payload header suppression function and a QoS mapping function in the case of consecutive data communication.

The MAC common part sublayer L22, which is the core part of the MAC layer, performs a system access function, a bandwidth allocation function, a connection establishing and maintenance function, and a QoS management function.

The privacy sublayer L21 performs a device authentication function, a security key exchange function, and an encryption function. Device authentication is performed by the privacy sublayer L21, and user authentication is performed by an upper layer (not illustrated) of the MAC.

FIG. 3 shows a brief diagram of a connection configuration between a BS (base station) and an SS in the wireless portable Internet system.

The MAC layer of the SS and the MAC layer of the BS have a connection C1 therebetween.

The phrase connection C1 in the present invention represents not a physically connected relation but rather a logically connected relation, and it is defined to be a mapping relation between MAC peers of the SS and the BS in order to transmit traffic of a single service flow.

Therefore, parameters or messages defined with respect to the connection C1 represent the functions between the MAC peers, and in reality, the parameters or the messages are processed, are converted into frames, and are transmitted through the physical layers, and the frames are parsed and the functions which correspond to the parameters or the messages are executed on the MAC layer.

The MAC messages include various messages for performing a request REQ, a response RSP, and an acknowledgment ACK for various operations.

FIG. 4 shows a frame diagram for illustrating resource allocation in a conventional wireless communication system.

The conventional cellular system for packet transmission allocates the radio resources in a shared channel format in order to effectively use the radio resources other than using a dedicated channel for random subscribers when using burst characteristics of packet data and allocating the radio resources for data transmission. Therefore, even one radio resource can transmit packet data for a plurality of subscribers. Also, since a subscriber station receives a unique identifier for distinguishing subscribers from a mobile communication network and concurrently receives a plurality of services with different QoS (quality of service), it receives a CD (connection identifier) and distinguishes services which one subscriber can concurrently receive.

As to the resource allocation diagram in the OFDMA system shown in FIG. 4, the horizontal axis indicates time-divided symbols and the vertical axis represents subchannels including a plurality of subcarriers. Radio resources WM1 to WM9 in the system are allocated in the square formats. The prior art generally suggests two methods for allocating the radio resources WM1 to WM9 to the subscriber.

FIG. 5 shows a conventional radio resource allocation method.

The first prior art allows the station to access the radio resource of the downlink allocated to the station as the radio resources WM1 to WM9 and the subscriber station information have 1:1 mapped relations. The prior art advantageously provides the subscriber station easy access to the radio resource and less power consumption, but cannot allocate efficient radio resources, as an empty resource space which fails to transmit data in the radio resource space is generated since it is difficult to accurately control the allocated two-dimensional area and the quantity of the packet data because of the characteristics of allocation of the radio resources allocated in the two-dimensional square structure based on the data transmit symbol units on the temporal axis and the subcarriers on the radio resource axis.

That is, as shown in FIG. 5, it is not guaranteed that the radio resource WMn allocated to a specific subscriber station is filled with the packet data P1 to P7, and the resource corresponding to the space S is problematically lost.

FIG. 6 shows another conventional radio resource allocation method in which information for a plurality of subscribers and a plurality of services with different connection identifiers concurrently provided to a subscriber station are allocated altogether.

This conventional method minimizes the area through which the data are not transmitted in the allocated two-dimensional radio resource space to thus maximize the efficiency of the allocated radio resource, but when the subscriber station SS receives a downlink, the subscriber station fails to detect the radio resource to which the packet data of the subscriber station are allocated, and hence, the subscriber station is to access all the radio resource blocks WM1 to WM10 transmitted to the downlink and retrieve information on the respective connections.

Therefore, the conventional method increases power consumption and is not appropriate for usage for the wireless portable Internet subscriber stations. That is, the above-described prior art are ineffective in the usage of radio resources and limit mobility of the subscriber stations because of large power consumption.

DISCLOSURE OF INVENTION

Technical Problem

It is an advantage of the present invention to provide a method and device for allowing low power consumption of mobile subscriber stations and increasing efficacy of battery usage by allocating a radio resource of a downlink, and concurrently transmitting subscriber information, accessing the radio resource to which packet data for a corresponding subscriber station is allocated, and retrieving information in a wireless portable network system.

In detail, the services with the same modulation and channel encoding methods combine the services having information on different subscribers and having different connections for one subscriber into a single group, allocate radio resources thereto, and transmit them. Also, information on the subscriber identifier on the allocated radio resource is transmitted through common control information. Therefore, information on a plurality of subscribers can be loaded on a single radio resource block, and can then be transmitted, and since the subscriber station having received downlink information can detect to which radio resource block the information for the corresponding station is allocated through the subscriber identifier information transmitted through the common control information, the present invention provides a method and device for acquiring information by accessing the specific radio resource block to which information for the subscriber is allocated in the received frame.

Technical Solution

In one aspect of the present invention, a method for allocating downlink radio resources in a wireless portable network system, comprises: (a) determining a modulation and channel encoding level of the respective radio resources according to radio channel characteristics; (b) generating subscriber station information on the radio resources; (c) mapping the subscriber station information to common control information; and (d) transmitting the allocated radio resource and the common control information to the downlink.

The step (c) comprises: mapping modulation and channel encoding level information of the respective radio resources to the common control information; and mapping time-based and frequency-based offset information of the respective radio resources to the common control information.

The subscriber station information comprises identifier information on the subscriber stations which access the respective radio resources, and information on numbers of the subscriber stations.

In another aspect of the present invention, a method for accessing downlink radio resources in a wireless network system, comprises: (a) allowing a subscriber station to receive a radio resource and a common control information block which stores subscriber station information on the radio resource; (b) retrieving a corresponding subscriber station identifier within the common control information block; (c) reading a modulation and channel encoding level of the corresponding radio resource from common control information corresponding to the retrieved subscriber station identifier, and determining a demodulation and channel decoding level; (d) checking the corresponding radio resource from the common control information corresponding to the retrieved subscriber station identifier; and (e) accessing the checked radio resource and receiving data information corresponding to the subscriber station by the determined demodulation and channel decoding method.

The step (d) comprises reading symbol-based offset information and subcarrier-based offset information of the corresponding radio resource from the common control information.

In still another aspect of the present invention, a base station device for allocating radio resources in a wireless portable network system, comprises: a base station controller including a radio resource allocator for allocating downlink data of subscriber stations which use the same modulation and channel encoding level to a single radio resource, and mapping information on the subscriber stations and the modulation and channel encoding level information to the common control information block; a digital signal transmitter for modulating and channel-encoding the radio resources allocated by the radio resource allocator with a specified identical modulation and channel encoding level; and an analog signal transmitter for converting the modulated and channel-encoded digital signals into analog signals, and transmitting the analog signals to the subscriber station.

The radio resource allocator comprises: a modulation level establisher for establishing a modulation level of the data to be allocated to a radio resource according to a characteristic of a radio channel, and mapping the level information to the common control information block; a channel encoding level establisher for establishing a channel encoding level of the data to be allocated to the radio resource according to a characteristic of a radio channel, and mapping the level information to the common control information block; a subscriber station establisher for mapping a subscriber identifier assigned to the radio resource to a common control block; and an offset establisher for establishing a position and a size of the radio resource on a frame by symbol offsets and subcarrier offsets, and mapping the offset information to the common control information block.

In still yet another aspect of the present invention, a subscriber station device for accessing radio resources in a wireless portable network system, comprises: an analog signal receiver for receiving analog radio signals and converting them into digital signals; a station controller including a common control information reader for reading transmitted common control information, and retrieving information on the radio resource to be accessed by the subscriber station device; and a digital signal receiver for performing demodulation and channel decoding according to the modulation and channel encoding level of the radio resource retrieved by the common control information reader, and receiving data information.

The common control information reader comprises: a subscriber station identifier retriever for retrieving radio resource information including subscriber station identifiers from the common control information block; a modulation and encoding level reader for modulation and encoding level information of the retrieved radio resource; and an offset information reader for reading symbol-based offset information and subcarrier-based offset information of the retrieved radio resource.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

Figure 1:
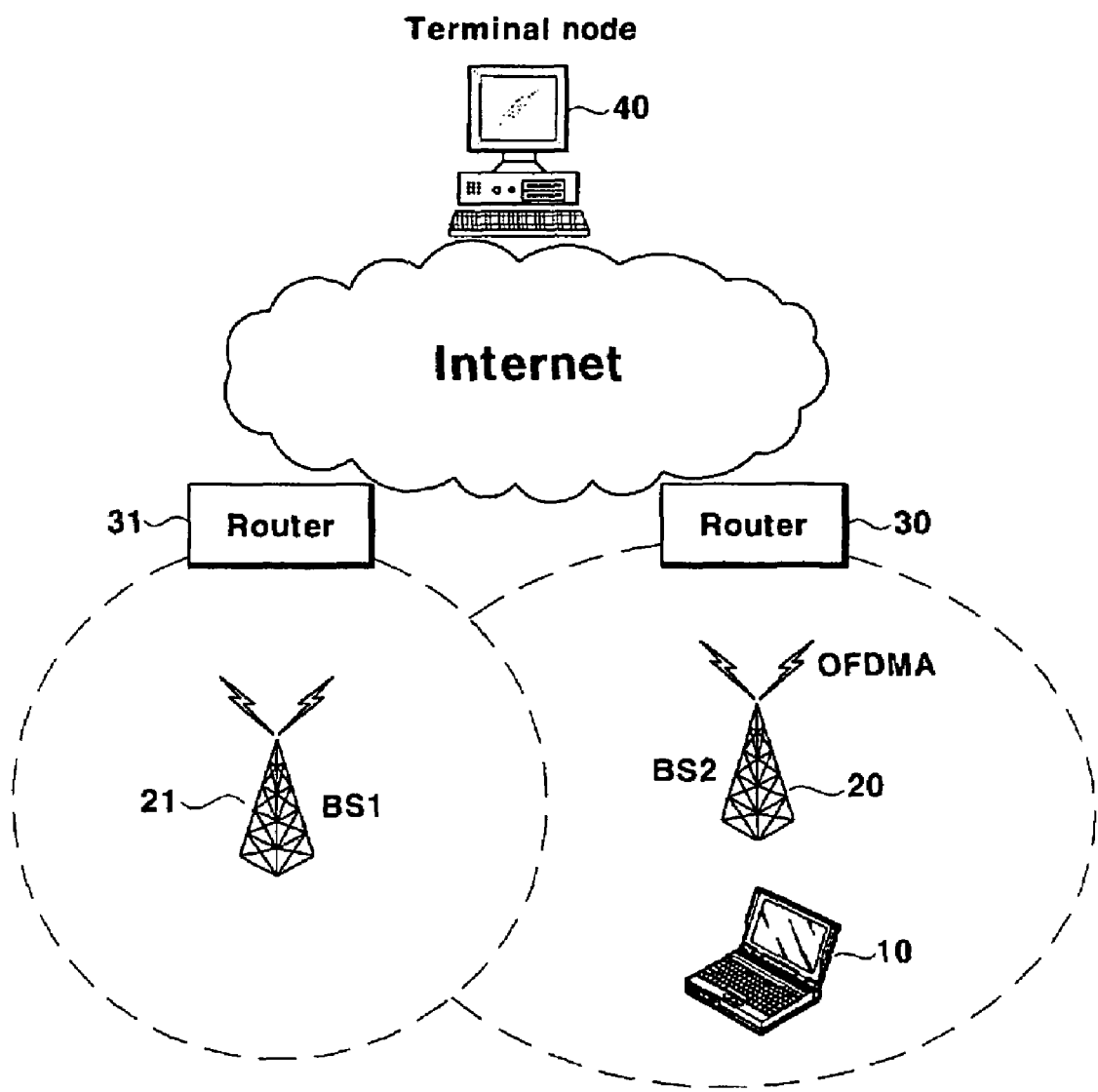
FIG. 1 shows a brief diagram of the wireless portable Internet.
Figure 2:
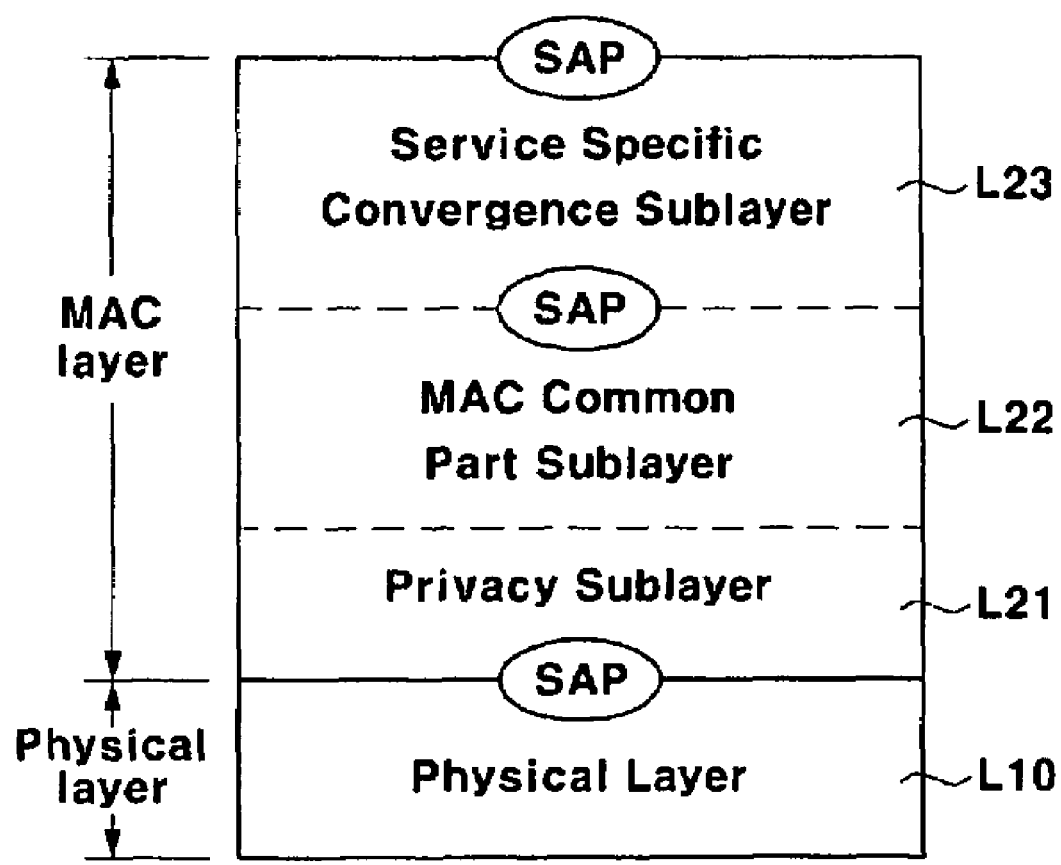
FIG. 2 shows a hierarchical structure of the wireless portable Internet system.
Figure 3:
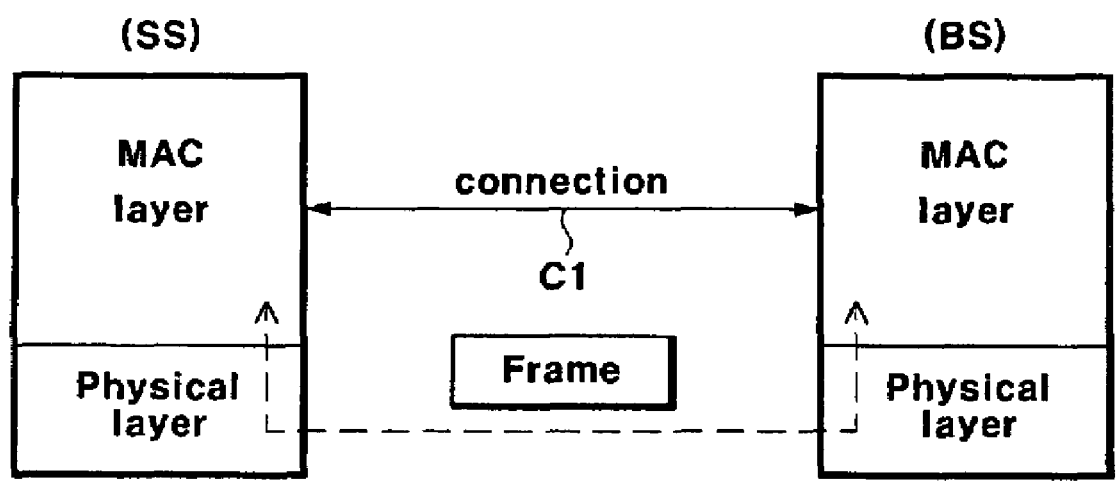
FIG. 3 shows a brief diagram of a connection configuration between a BS and an SS in the wireless portable Internet system.
Figure 4:
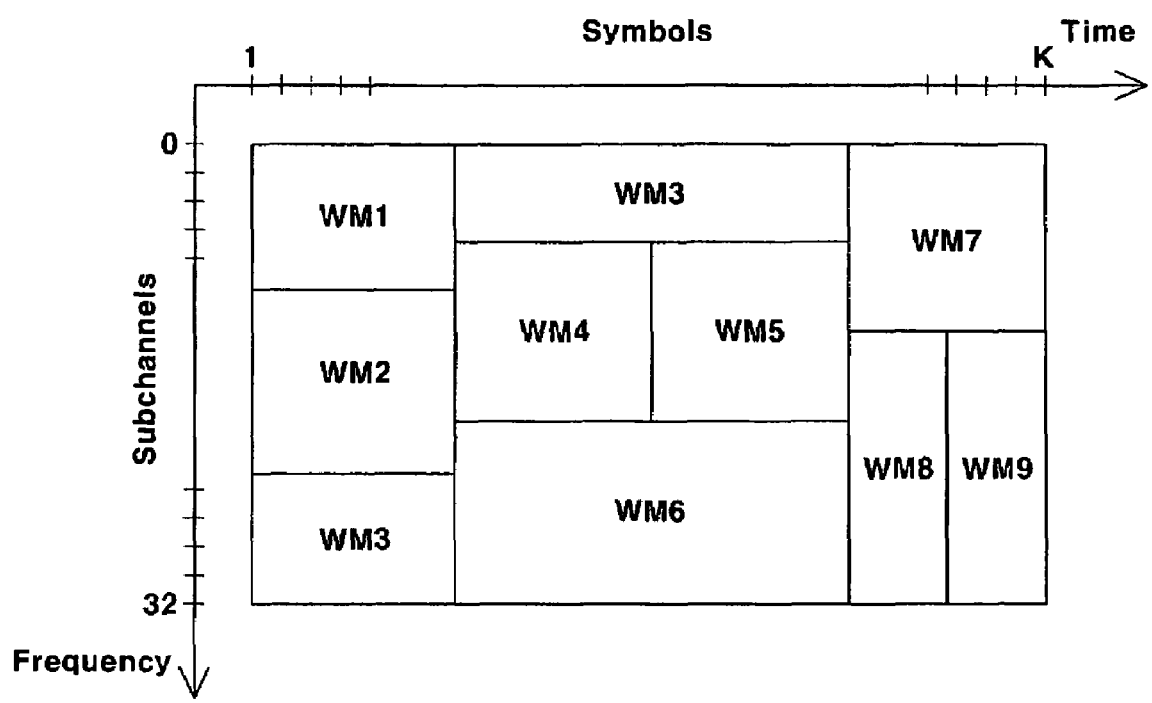
FIG. 4 shows a frame diagram for illustrating resource allocation in a conventional wireless communication system.
Figure 5:
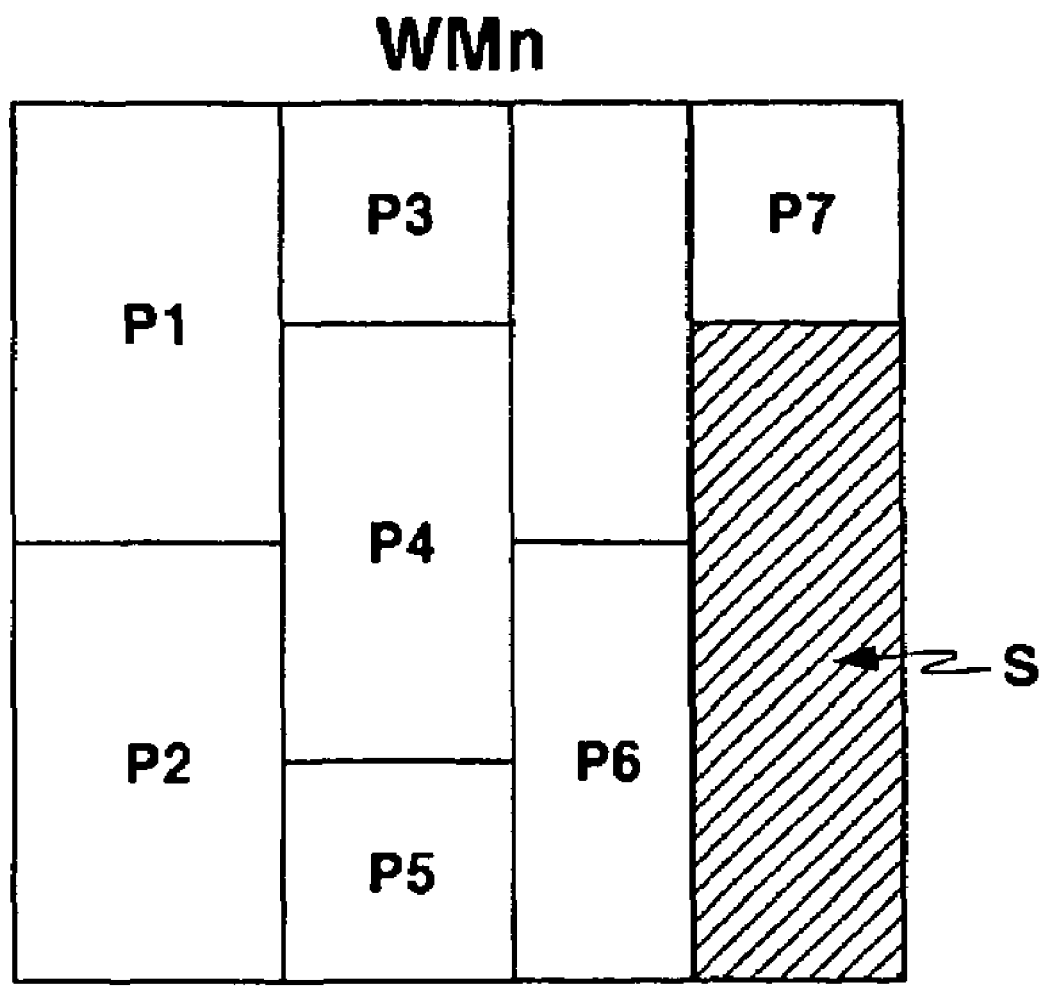
FIG. 5 shows a conventional radio resource allocation method.
Figure 6:
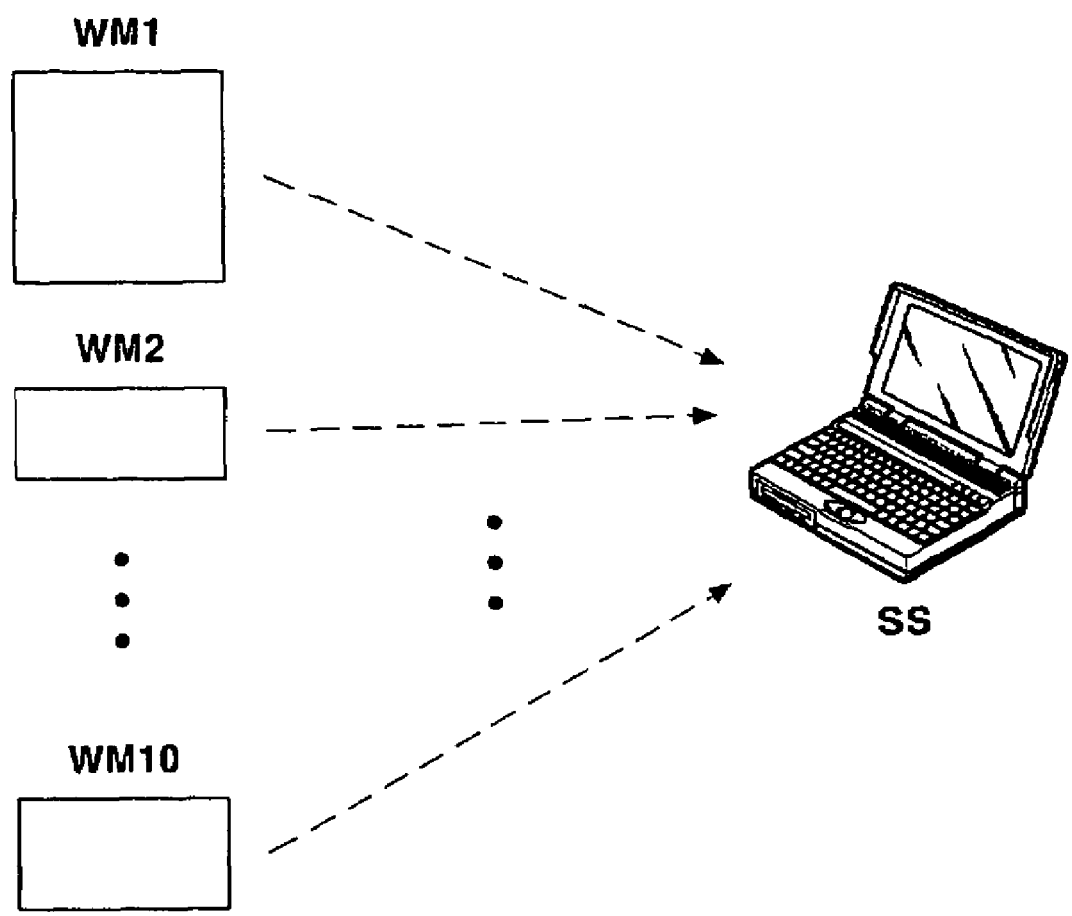
FIG. 6 shows another conventional radio resource allocation method.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A radio resource allocating method and device according to a preferred embodiment of the present invention will be described in detail with reference to drawings.

Figure 7:
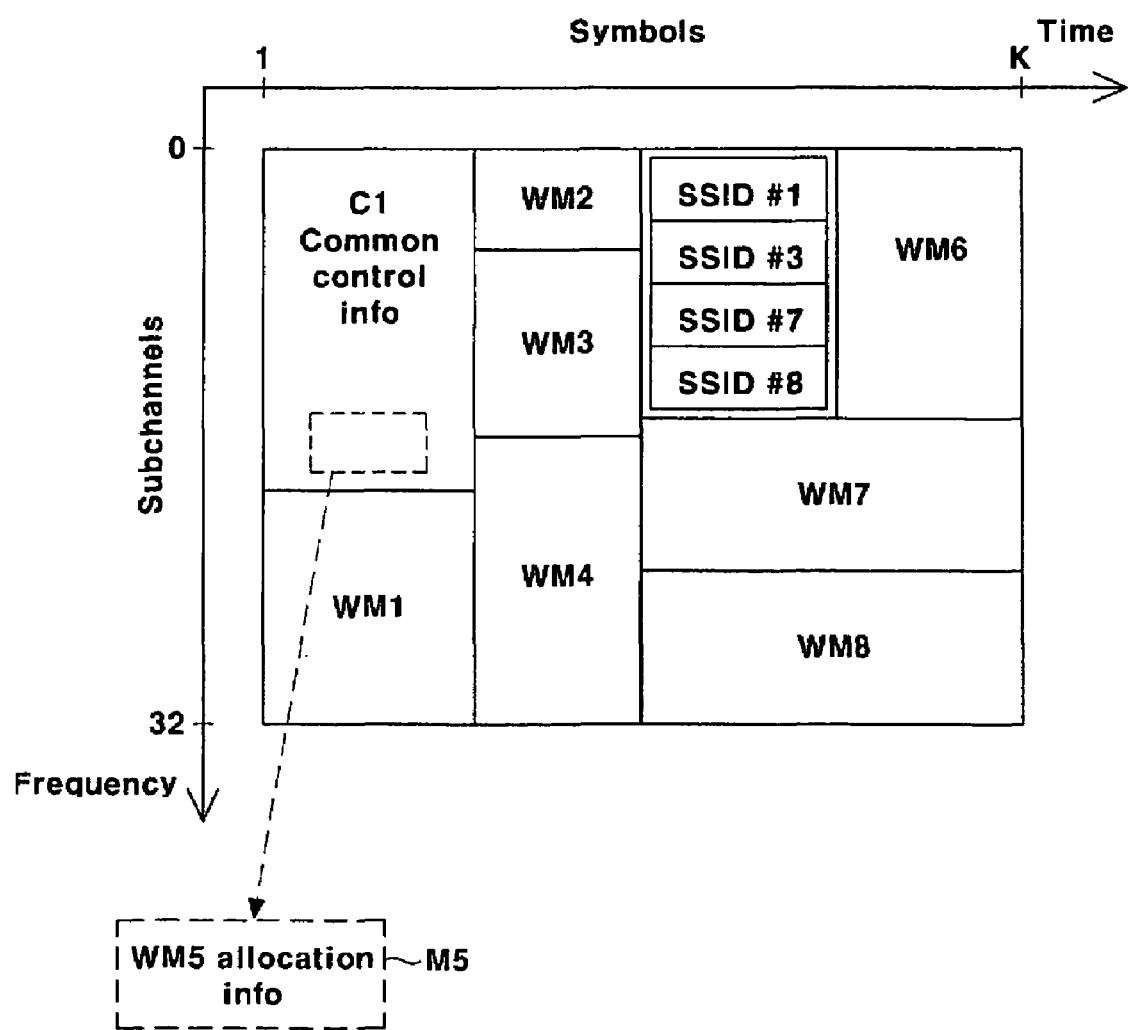
FIG. 7 shows allocation of radio resources according to a preferred embodiment of the present invention.

FIG. 7 shows allocation of radio resources according to a preferred embodiment of the present invention.

The radio resource according to the preferred embodiment of the present invention comprises two-dimensional radio resource blocks WM1 to WM8 in the square format, and a common control information block (C1) including information on the allocated radio resource.

As described, the radio resource blocks WM1 to WM8 and the common control information block (C1) are formed in the two-dimensional structure of subcarriers and time-divided symbols. The radio resource blocks WM1 to WM8 have the sane modulation and channel encoding level, and comprise service information on a plurality of subscriber stations. Therefore, the respective radio resource blocks WM1 to WM8 respectively include subscriber identifiers. For example, the radio resource block WM5 includes a plurality of subscriber identifiers SSD#1, SSD#3, SSD#7, and SSD#8.

The common control information block (C1) includes information on the respective radio resources WM1 to WM8 included in the frame. For example, common information control information M1 to M8 display included states of subscriber identification information allocated to the radio resources WM1 to WM8, and the common information control information M5 including subscriber identification information has radio resource allocation information on the radio resource WM5.

Therefore, the subscriber stations can receive the common control information block (C1), retrieve desired radio resource information, and access corresponding radio resources.

In its actual realization, the station in the case of FIG. 7 may buffer the radio resource WM1 which is received at the same time as that of the common control information block, and may buffer the radio resources WM2, WM3, and WM4 depending on performance of the station since a processing time is needed until the station receives information of the common control information block (a) and reads corresponding information. This buffering process may substantially increase the buffer size required by the station, for example, the station which has an allocated resource block of the station in the radio resource WM1 may have a loss on the processing time since the station starts an access to the allocated resource block of the station after finishing reading the common control information block. Further, the size of the common control information block including subscriber identification information of the radio resources can be increased, which may be disadvantageous for effective usage of radio resources. Therefore, a receiver of the station can consider a processing time which is required until reading the common control information block, and it may not include subscriber identification information on part of the former one of the downlink radio resources into the common control information block but it may include the subscriber identification information into the subsequent radio resources (the radio resources WM5 to WM8 in the case of FIG. 7), and transmit them.

In this instance, the stations receive the common control information blocks, read them, check included states of subscriber identification information, access the radio resource blocks which include no subscriber identification information, retrieve whether downlink data transmitted to the stations are provided thereto, read subscriber identification information of the radio resource blocks which include the subscriber identification information of the corresponding radio resource in the common control information blocks, and thus retrieve the radio resource blocks allocated to the stations.

Also, when the station previously has knowledge on included states of allocation information on the radio resource included in the common control information block in the above-noted example (e.g., if the station knows a rule that the subscriber identification information on the radio resources WM1 to WM4 is not included in the common control information block), the station directly accesses the radio resources WM1 to WM4 to find radio resource blocks allocated to the station (without reading the subscriber identification information from the common control information block) in the case of the radio resources WM1 to WM4, and the station accesses the radio resource blocks allocated to the station according to the subscriber identification information allocated to the respective resources WM5 to WM8 obtained through the common information control block in the case of the radio resources WM5 to WM8.

Figure 8:
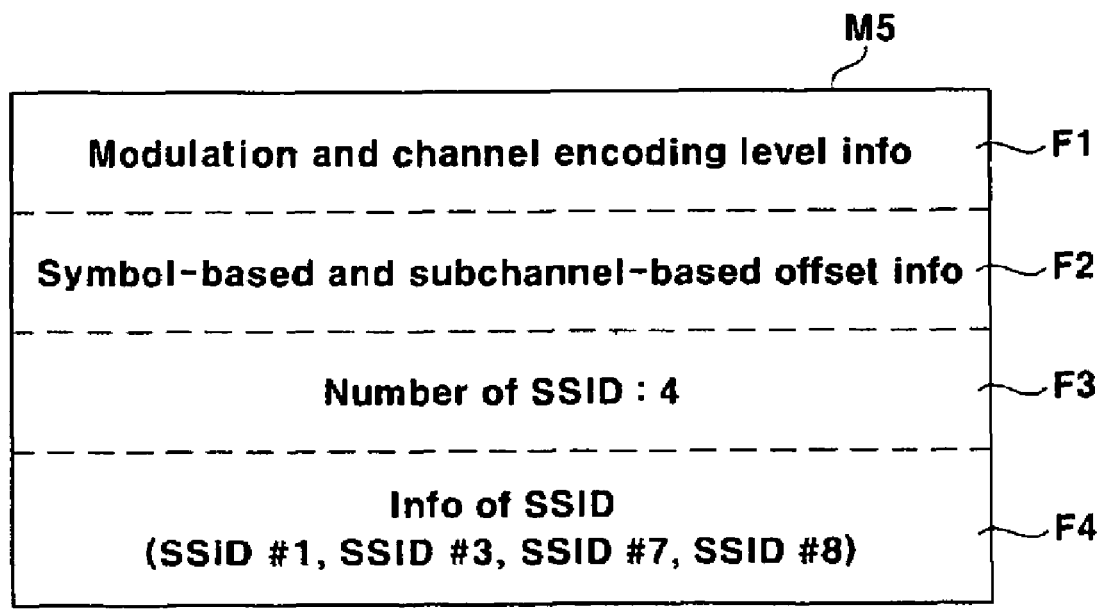
FIG. 8 shows a configuration diagram of a common control information block according to a preferred embodiment of the present invention.

FIG. 8 shows a configuration diagram of common control information according to a preferred embodiment of the present invention.

The common control information of the radio resource WM5 comprises modulation and channel encoding level information F1 of a corresponding radio resource, symbols and subchannels offset information F2, numbers of subscriber identifier information F3, and subscriber identifier information F4.

The modulation and channel encoding level information F1 of the radio resource includes common modulation and channel encoding information of the corresponding radio resource WM5. As described above, the radio resources are allocated based on the identical modulation and channel encoding information.

The symbols and subchannels offset information F2 includes offset information on the vertical axis and the horizontal axis of the corresponding radio resource WM5, and hence, it provides position information on the radio resource WM5 corresponding to the offset of the symbol and the subchannel.

The numbers of subscriber identifier information F3 indicates numbers of subscriber stations which use the radio resource WM5.

The subscriber identifier information F4 includes identifiers of subscriber stations which use the radio resource WM5.

Therefore, the subscriber stations of the downlink receive the common control information block (C1) through a broadcast channel, and retrieve radio resources to which subscriber identifiers of the subscriber stations are provided. When the radio resource to which the subscriber identifier of the subscriber station is provided is found, the subscriber station reads the position of the radio resource and the modulation and channel encoding information, and accesses the radio resource allocated to the subscriber station. As shown in FIG. 7, since the radio resource comprises subscriber identifiers of information on a plurality of services, the subscriber station can receive the service information which includes the subscriber identifier of the subscriber station from among the radio resources accessed by the subscriber station.

Figure 9:
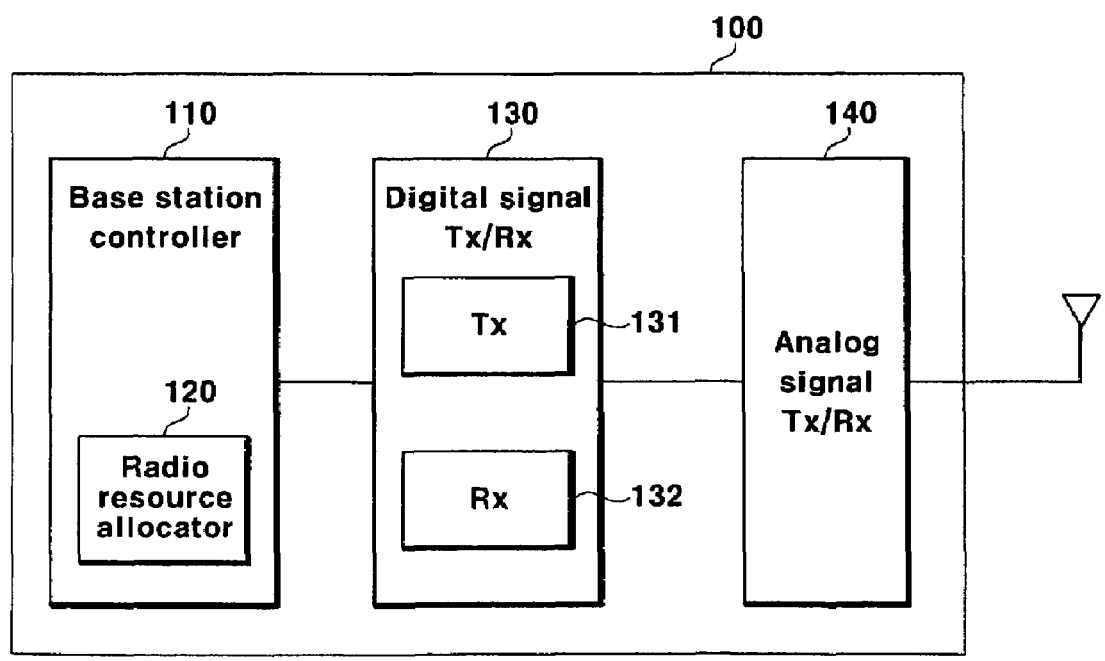
FIG. 9 shows a configuration diagram of a base station in a radio resource allocator according to a preferred embodiment of the present invention.

FIG. 9 shows a configuration diagram of a base station 100 in a radio resource allocator according to a preferred embodiment of the present invention.

The base station 100 comprises a base station controller 110, a digital signal transmitter and receiver 130, and an analog signal transmitter and receiver 140. The base station controller 110 comprises a radio resource allocator 120 for allocating radio resources, and the digital signal transmitter and receiver 130 comprises a transmitter 131 for selectively performing transmit/receive functions, and a receiver 132.

The radio resource allocator 120 allocates subscribers who use the identical modulation and channel encoding and services which have different connection identifiers within the identical subscribers to a single block in the radio resources so as to be fit to the QoS of the packet data to be transmitted to the downlink. Also, the radio resource allocator 120 allocates per-subscriber packet data to each radio resource block in the modulation and channel encoding level allowed by the system in a like manner. The allocated subscriber information and the modulation and channel encoding information of the radio resource are mapped to the common control information block.

The transmitter 131 modulates and encodes modulation and channel encoding level information of the radio resource block within a frame, symbols and subchannels offset information, numbers of the subscriber stations allocated to the radio resource block, and the corresponding station identifier information in the common control information block according to the modulation and channel encoding level so that the station may appropriately demodulate and channel-decode the data within the received radio resource.

The modulated and encoded radio resource block is transmitted to the subscriber station by air by using the analog signal transmitter and receiver 140.

Figure 10:
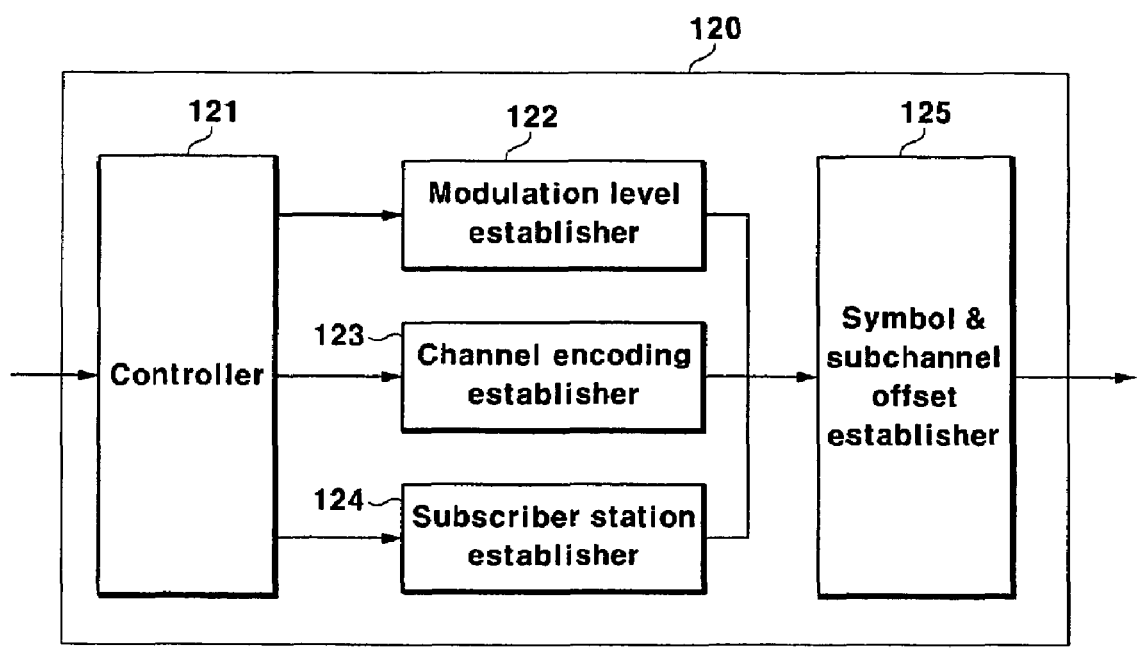
FIG. 10 shows a configuration diagram of a radio resource allocation unit of a base station according to a preferred embodiment of the present invention.

FIG. 10 shows a configuration diagram of a radio resource allocation unit of a base station according to a preferred embodiment of the present invention.

The radio resource allocator 120 comprises a modulation level establisher 122, a channel encoding establisher 123, a subscriber station establisher 124, a symbol and subchannel offset establisher 125, and a controller 121.

The modulation level establisher 122 and the channel encoding establisher 123 select the identical modulation level and the channel encoding level and allocate them to the same radio resource according to the QoS policy. For example, they select the QPSK, 16-QAM, and 32-QAM for the modulation level according to characteristics (e.g., the SNR (signal to noise ratio)) of the physical channel of the downlink, and select the BTC, CTC, or RM encoding method for the channel encoding level. The modulation level establisher 122 and the channel encoding establisher 123 map the established modulation and channel encoding level information to the common control information block.

The subscriber station establisher 124 provides data included in the allocated radio resource, and a subscriber identifier to be used for the common control information block so that the subscriber station ray distinguish a radio resource to be accessed by the subscriber station through the common control information block and distinguish the data of the subscriber station from among the radio resource in the case of the downlink.

The symbol and subchannel offset establisher 125 specifies the two-dimensional position and size of the allocated radio resource on the frame by specifying a symbol-based offset on the temporal axis and a subchannel-based or, subcarrier-based) offset on the frequency axis. The offset unit on the frequency axis is given with the subchannel in the preferred embodiment, and the same can be given with the subcarrier. The offset information is mapped to the common control information block to thus provide position information of the radio resource allocated to the subscriber station.

The controller 121 controls the modulation level establisher 122, the channel encoding establisher 123, and the subscriber station establisher 124 to thereby control radio allocation.

Figure 11:
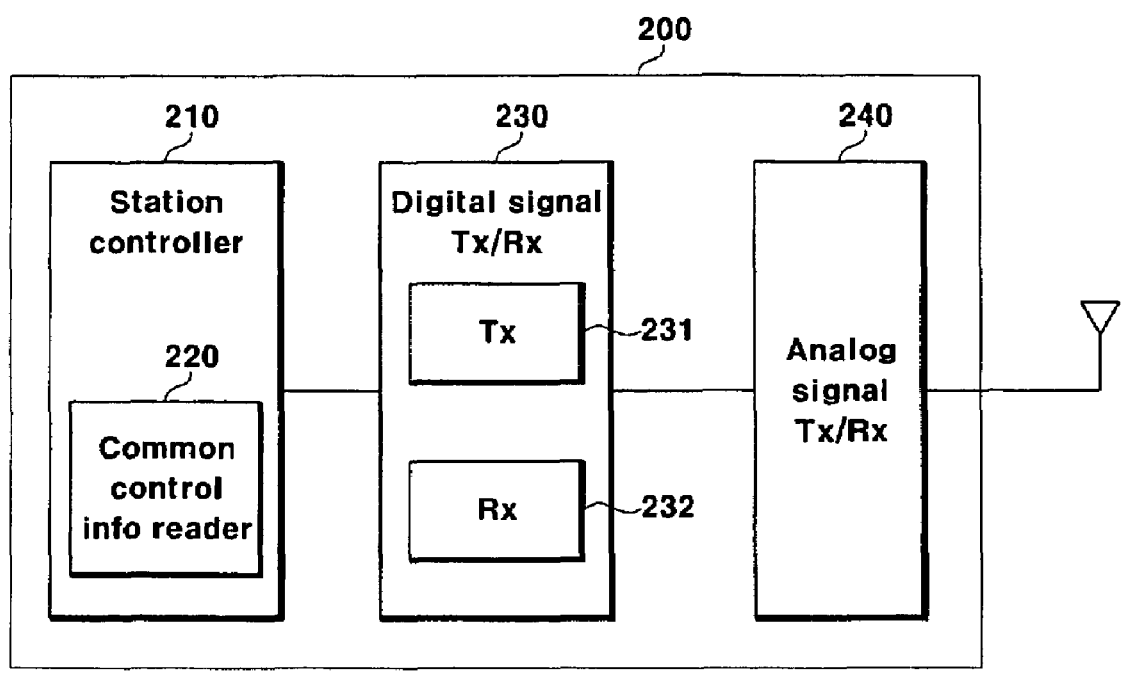
FIG. 11 shows a configuration diagram of a station of a radio resource allocator according to a preferred embodiment of the present invention.

FIG. 11 shows a configuration diagram of a station 200 of a radio resource allocator according to a preferred embodiment of the present invention.

The station 200 comprises a station controller 210, a digital signal transmitter and receiver 230, and an analog signal transmitter and receiver 240. The station controller 210 comprises a common control information reader 220. The digital signal transmitter and receiver 230 comprises a transmitter 231 for transmitting and receiving digital signals, and a receiver 232.

The common control information reader 220 reads the common control information transmitted to all the stations through the broadcast channel, and retrieves a desired radio resource. The station controller 230 controls the digital signal transmitter and receiver 230 according to reading results of the common control information reader 220, and demodulates and decodes the data of the radio resource through an appropriate demodulation and channel decoding method.

Figure 12:
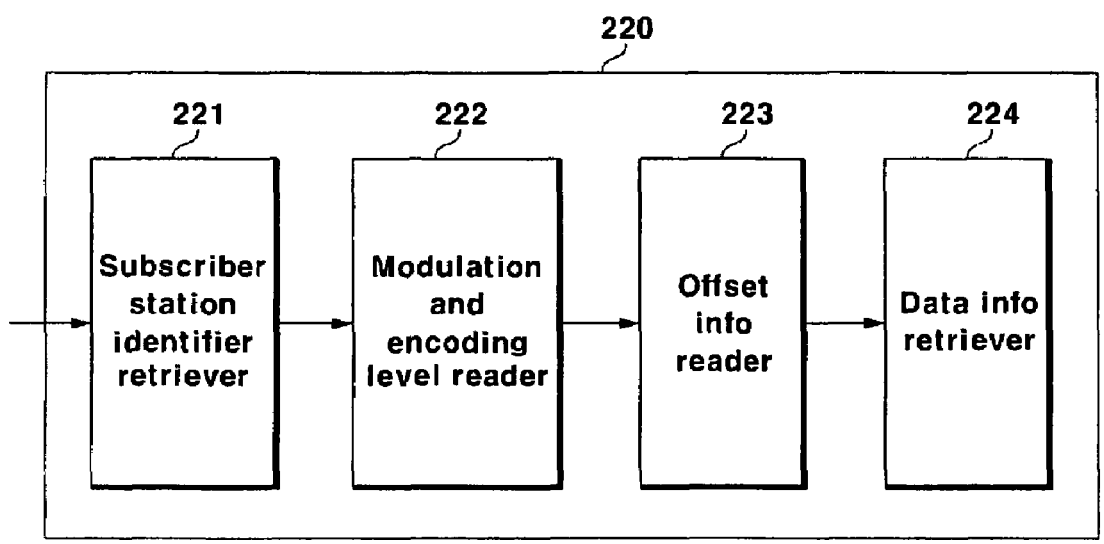
FIG. 12 shows a block diagram of a common control information reader according to a preferred embodiment of the present invention.

FIG. 12 shows a block diagram of a common control information reader according to a preferred embodiment of the present invention.

The common control information reader 220 comprises a subscriber station identifier retriever 221, a modulation and encoding level reader 222, an offset information reader 223, and a data information retriever 224.

On receiving a common control information block, the station 200 uses the subscriber station identifier retriever 221 of the common control information reader 220 to retrieve whether the radio resource which has the subscriber station identifier of the station 200 is provided in the common control information block.

When the radio resource including the identifier of the station 200 is found, the modulation and encoding level reader 222 reads modulation and encoding level information of the corresponding radio resource from the common control information block. The modulation and encoding level information is transmitted to the receiver of the digital transmitter and receiver, and is used for demodulating and decoding the radio resource.

The offset information reader 223 reads a subchannel-based offset (or, a subcarrier-based offset) and a symbol-based offset, and detects the position of the allocated radio resource.

When the position of the radio resource is found, the data information retriever 224 retrieves data information which has the subscriber identifier of the data information retriever 224 from among the data information for a plurality of subscribers from among the radio resources. The station controller 210 controls the station to access the radio resource and the data information allocated to the station controller 210.

According to the above-described configuration, the station analyzes information on the common control block having the characteristic of broadcast information, checks whether a radio resource allocated to the station is provided, acquires modulation and encoding level information of the corresponding radio resource, and demodulates and decodes the corresponding radio resource with an adequate level. Accordingly, the station does not need to check all the transmitted radio resources, and the radio resources are appropriately managed to fit to the QoS policy without waste of power consumption.

Figure 13:
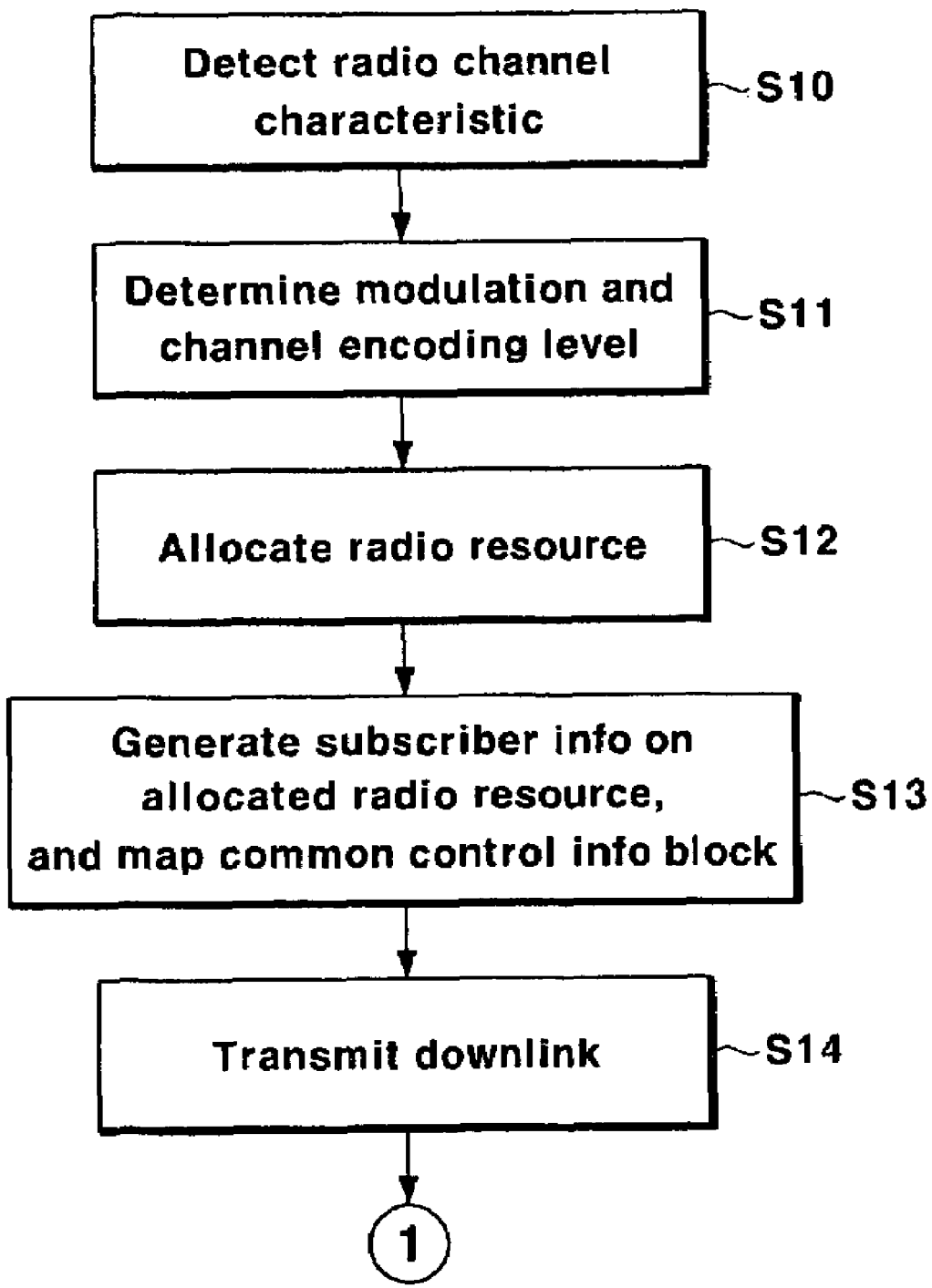
FIG. 13 shows a flowchart for a radio resource allocating method according to a preferred embodiment of the present invention.

FIG. 13 shows a flowchart for a radio resource allocating method according to a preferred embodiment of the present invention.

The base station catches a radio channel characteristic of the downlink through an MAC message (e.g., a channel descriptor message) for describing the characteristic of the physical layer in step S10.

The base station adaptively determines a modulation and channel encoding level according to the characteristic of the physical layer caught through the MAC message in step S11. For example, the modulation and channel encoding level is determined according to the SNR caught in the physical layer.

When the modulation and channel encoding level is determined, a radio resource corresponding to the modulation and channel encoding level is allocated in step S12. The radio resource determines the symbol-based offset and the subchannel-based (or, subcarrier-based) offset, and determines the position and the size on the frame.

When the radio resource is allocated, subscriber information on the allocated radio resource is generated, and it is mapped to the common control information block in step S13. When subscriber information on the radio resource allocation and the radio resource is mapped to the common control information block, packet data are generated into frames and the frames are transmitted to the downlink in step S14.

Figure 14:
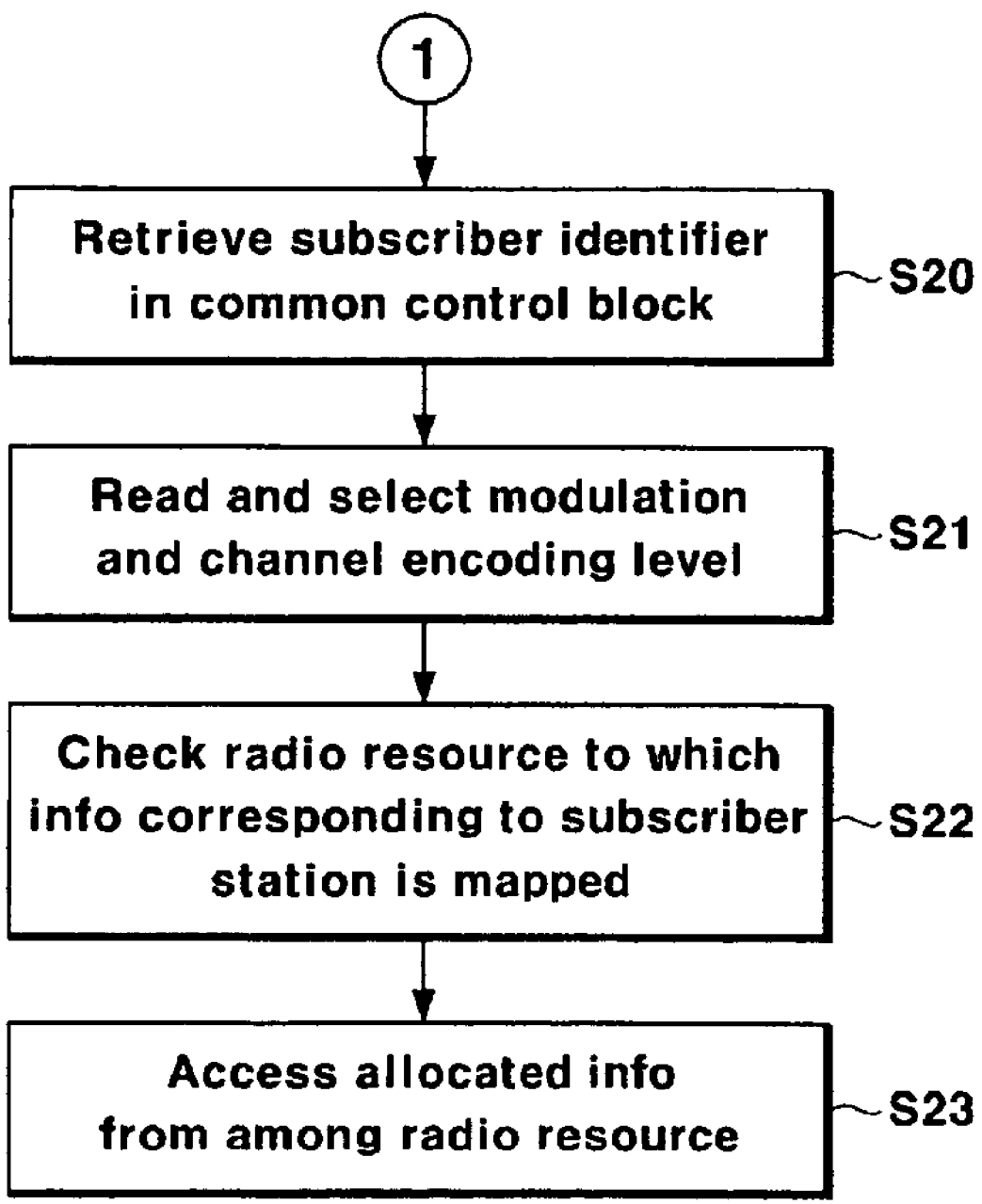
FIG. 14 shows a flowchart of a method for a subscriber station to access a downlink radio resource according to a preferred embodiment of the present invention.

FIG. 14 shows a flowchart of a method for a subscriber station to access a downlink radio resource according to a preferred embodiment of the present invention.

When receiving the common control information block transmitted through the broadcast channel of the downlink, the subscriber station retrieves whether the subscriber identifier of the subscriber station is provided in the common control block in step S20. The common control block includes subscriber information on the respective radio resources allocated according to the identical modulation and channel encoding level.

When the common control block including the subscriber identifier of the subscriber station is found, the subscriber station reads the modulation and channel encoding level of the radio resource corresponding to the common control information block, and selects a demodulation and channel decoding level of the subscriber station in order to receive the modulation and channel encoding level in step S21.

When the subscriber identifier is retrieved, the subscriber station checks the position and the size of the radio resource to which information for the corresponding station is mapped in step S22.

When the radio resource allocated to the subscriber station is allocated, the subscriber station accesses the radio resource according to the selected demodulation and channel decoding method, retrieves the data allocated to the corresponding station, and receives the same in step S23.

As known from the above-described embodiment, loss of the radio resources is prevented since the radio resources are allocated based on the identical modulation and channel encoding level. The subscriber station initially receives the common control information, acquires information on the radio resource, acquires information on the radio resource to be accessed by the subscriber station, and accesses the radio resource. Therefore, power consumption is saved since there is no need to access all the radio resources, and the power consumption supports high mobility in the wireless Internet system which generally uses batteries.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the above-mentioned configuration, when allocating the radio resource of the downlink, subscriber information is transmitted to the common control information block, the corresponding subscriber station accesses the radio resource to which the packet data of the subscriber station are allocated, and retrieves desired information, and accordingly, low power consumption of the mobile subscriber station is allowed to thus maximize usage efficiency of batteries.

The invention claimed is:

1. A method for a base station to transmit allocation information of downlink radio resource to a subscriber terminal in an OFDMA (Orthogonal Frequency Division Multiple Access) communication system, the method comprising:
    mapping, to a first region of a common control information of the downlink radio resource, allocation information for at least one subscriber terminal corresponding to a second region of the radio resource in a downlink frame composed of a predetermined number of symbols and a predetermined number of subchannels; and
    transmitting the common control information to the at least one subscriber terminal in a time duration of the downlink frame;
    wherein the allocation information includes:
        at least one identifier for the at least one subscriber terminal and a number of the at least one subscriber terminal; and
        symbol offset information and subchannel offset information indicating a two-dimensional position of the second region in the downlink frame.

2. The method of claim 1, further comprising mapping the symbol offset information and the subchannel offset information of the second region of the radio resource to the common control information of the downlink radio resource.

3. The method of claim 1, further comprising mapping the modulation and channel encoding information of the radio resource to the common control information of the downlink radio resource.

4. The method of claim 1, wherein when the downlink frame includes a plurality of the second regions, allocation information for at least one subscriber terminal corresponding to one of the second regions is mapped to the first region and allocation information for at least one subscriber terminal corresponding to the rest of the second regions is not mapped to the first region.

5. A method for a subscriber terminal to access a downlink radio resource in an OFDMA (Orthogonal Frequency Division Multiple Access) communication system, the method comprising:
    receiving a common control information including a plurality of allocation information for a plurality of radio resource blocks in a downlink frame composed of a predetermined number of symbols and a predetermined number of subchannels, wherein each of the plurality of allocation information includes at least one identifier for at least one subscriber terminal and a number of the at least one subscriber terminal, and symbol offset information and subchannel offset information indicating a two-dimensional position of a radio resource block in the downlink frame;
    searching allocation information corresponding to an identifier of the subscriber terminal among the plurality of allocation information; and
    accessing a radio resource block by using symbol offset information and subchannel offset information corresponding to the searched allocation information among the plurality of radio resource blocks.

6. The method of claim 5, wherein one of the plurality of radio resource blocks corresponding to the at least one allocation information is allocated to the at least one subscriber terminal.

7. The method of claim 6, wherein the at least one allocation information further comprises modulation and channel encoding information of the corresponding radio block.

8. The method of claim 5, wherein the common control information includes a plurality of allocation information for a part of the plurality of radio resource blocks and does not include allocation information for the rest of the plurality of radio resource blocks.

9. The method of claim 8, further comprising accessing the rest of the plurality of radio resource blocks and determining whether the identifier corresponding to the subscriber terminal is included therein,
    wherein the searching allocation information including the identifier corresponding to the subscriber terminal among the plurality of allocation information for the part of the plurality of radio resource blocks.

10. An apparatus for transmitting allocation information of downlink radio resource to a subscriber terminal in an OFDMA (Orthogonal Frequency Division Multiple Access) communication system, the apparatus comprising:
    means for mapping, to a first region of a common control information block of the downlink radio resource, an allocation information for at least one subscriber terminal corresponding to a second region of the radio resource in a downlink frame composed of a predetermined number of symbols and a predetermined number of subchannels; and
    means for transmitting the common control information block to the at least one subscriber terminal in a time duration of the downlink frame;

wherein the allocation information includes:
- at least one identifier for the at least one subscriber terminal and the number of the at least one subscriber terminal; and
- symbol offset information and subchannel offset information indicating a two-dimensional position of the second region in the downlink frame.

11. The apparatus of claim 10, further comprising means for mapping the symbol offset information and the subchannel offset information of the second region to the first region in the downlink frame.

12. The apparatus of claim 10, further comprising means for mapping modulation and channel encoding information of the radio resource to the first region in the downlink frame.

13. The method of claim 10, wherein when the downlink frame includes a plurality of the second regions, allocation information for at least one subscriber terminal corresponding to a part of the second regions is mapped to the first region and allocation information for at least one subscriber terminal corresponding to the rest of the second regions is not mapped to the first region.

14. A method for a base station to generate downlink frame in an OFDMA (Orthogonal Frequency Division Multiple Access) communication system, the method comprising:
- allocating a radio resource block to the frame;
- allocating a common control information block to the frame;
- determining whether to map, to the common control information block, allocation information for at least one subscriber terminal corresponding to the radio resource block in a downlink frame composed of the predetermined number of symbols and the predetermined number of subchannels; and
- mapping, to the common control information block, at least one identifier for the at least one subscriber terminal and a number of the at least one subscriber terminal, and symbol offset information and subchannel offset information indicating a two-dimensional position of the radio resource block in the downlink frame when the allocation information for the at least one subscriber terminal is mapped to the common control information block.

15. The method of claim 14, further comprising mapping modulation and channel encoding information of the radio resource to the common control information block in the downlink frame.

16. The method of claim 14, wherein when the downlink frame includes a plurality of radio resource blocks, allocation information for at least one subscriber terminal corresponding to a part of the radio resource blocks is mapped to the common control information block and allocation information for at least one subscriber terminal corresponding to the rest of the radio resource blocks is not mapped to the common control blocks.

17. A method for a base station to generate downlink frame in an OFDMA (Orthogonal Frequency Division Multiple Access) communication system, the method comprising:
- allocating a plurality of radio resource blocks including a first radio resource block for at least one first subscriber terminal and a second radio resource block for at least one second subscriber terminal in a downlink frame composed of the predetermined number of symbols and the predetermined number of subchannels;
- allocating a common control information block including a plurality of common control information to the frame, the plurality of common information including a first common control information for the first radio resource block and a second common control information for the second radio resource block; and
- mapping, to a common control information of the common control information block, an allocation information for the at least one first subscriber terminal corresponding to the first radio resource block in the downlink frame;

wherein the allocation information includes:
- at least one identifier for the at least one first subscriber terminal and the number of the at least one first subscriber terminal; and
- symbol offset information and subchannel offset information indicating a two-dimensional position of the first radio resource block in the downlink frame.

18. The method of claim 17, wherein an identifier for the at least one second subscriber terminal and the number of the at least one second subscriber terminal are not mapped to the second common control information.

19. The method of claim 17, further comprising mapping modulation and channel encoding information of the first radio resource to the first common control information.

* * * * *